(12) United States Patent
Blasco Serrano et al.

(10) Patent No.: US 11,564,256 B2
(45) Date of Patent: Jan. 24, 2023

(54) RESOURCE SELECTION BASED ON LATENCY REQUIREMENTS

(71) Applicant: Telefonaktiebolaget LM Ericsson (publ), Stockholm (SE)

(72) Inventors: Ricardo Blasco Serrano, Espoo (FI); Stefano Sorrentino, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/337,877

(22) Filed: Jun. 3, 2021

(65) Prior Publication Data

US 2021/0289549 A1    Sep. 16, 2021

Related U.S. Application Data

(63) Continuation of application No. 16/480,751, filed as application No. PCT/SE2018/050129 on Feb. 13, 2018, now Pat. No. 11,051,336.

(60) Provisional application No. 62/458,323, filed on Feb. 13, 2017.

(51) Int. Cl.
| | |
|---|---|
| H04W 74/08 | (2009.01) |
| H04L 5/00 | (2006.01) |
| H04W 4/40 | (2018.01) |
| H04W 28/02 | (2009.01) |
| H04W 72/02 | (2009.01) |
| H04L 1/00 | (2006.01) |
| H04W 72/04 | (2009.01) |

(52) U.S. Cl.
CPC ....... *H04W 74/0808* (2013.01); *H04L 1/0003* (2013.01); *H04L 5/0082* (2013.01); *H04W 4/40* (2018.02); *H04W 28/0289* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 10,383,114 B2 * | 8/2019 | Jiang | H04L 47/27 |
| 2004/0131013 A1 * | 7/2004 | Ise | H04L 47/70 |
| | | | 370/229 |
| 2010/0202400 A1 | 8/2010 | Richardson et al. | |

(Continued)

FOREIGN PATENT DOCUMENTS

KR    1020110044902 A    5/2011

OTHER PUBLICATIONS

Korean Notice of Allowance with English Machine Translation dated Jan. 27, 2022 for Korean Patent Application No. 20197026925, consisting of 7-pages.

(Continued)

*Primary Examiner* — Hong S Cho
(74) *Attorney, Agent, or Firm* — Christopher & Weisberg, P.A.

(57) ABSTRACT

A method and wireless device for determining a time interval, T2, for selecting a time-frequency resource are disclosed. According to one aspect, a method includes determining the time interval based on at least one parameter serving as a proxy indicative of a likelihood of collision. In some embodiments, at least one of the at least one parameter is a priority level indication, such that a higher priority transmission results in a lower value of T2.

23 Claims, 4 Drawing Sheets

(56) References Cited

U.S. PATENT DOCUMENTS

| | | |
|---|---|---|
| 2016/0219627 A1 | 7/2016 | Au et al. |
| 2017/0013596 A1 | 1/2017 | van Phan et al. |
| 2019/0116586 A1 | 4/2019 | Basu Mallick et al. |
| 2020/0100251 A1 | 3/2020 | Yerramalli |

OTHER PUBLICATIONS

3GPP TSG RAN WG1 Meeting #86 R1-166759; Title: Discussion on URLLC in NR; Agenda Item: 8.1.3.2; Source: Samsung; Document for: Discussion and decision; Date and Location: Aug. 22-26, 2016, Gothenburg, Sweden, consisting of 5-pages.
3GPP TSG RAN WG1 Meeting #87 R1-1612102; Title: Details of resource selection using partial sensing by P-UEs; Agenda Item: 6.2.1.2.2; Source: ZTE; Document for: Discussion and Decision; Date and Location: Nov. 14-18, 2016, Reno, USA, consisting of 3-pages.
Kim Wooseong et al.; Cognitive multicast with partially overlapped channels in vehicular ad hoc networks; Ad Hoc Networks vol. 11, Issue 7; ScienceDirect; Sep. 2013, consisting of 9-pages.
Korean Office Action with English Summary Translation dated Jun. 30, 2021 for Korean Patent Application No. 20197026925, consisting of 8-pages.
International Search Report and Written Opinion dated May 31, 2018 for International Application No. PCT/SE2018/050129 filed on Feb. 13, 2018, consisting of 13-pages.
3GPP TSG-RAN WG1 Meeting #88 R1-1720219; Title: Details of partial sensing by P-UE's; Source: Xinwei; Agenda Item: 7.2.1.2; Document for: Discussion; Location and Date: Athens, Greece, Feb. 13-17, 2017, consisting of 4-pages.
3GPP TSG RAN WG1 Meeting #88 R1-1702144; Title: On Support of Short Transmission Period for V2V Communication; Source: Intel Corporation; Agenda Item: 7.2.1.4; Document for: Discussion and Decision; Location and Date: Athens, Greece, Feb. 13-17, 2017, consisting of 6-pages.
3GPP TSG RAN WG1 Meeting #86bis R1-1609462; Title: Sidelink enhancements to support V2V traffic with smaller periodicity; Source: Intel Corporation; Agenda Item: 7.2.1.5.5; Document for: Discussion and Decision; Location and Date: Lisbon, Portugal, Oct. 10-14, 2016, consisting of 3-pages.
3GPP TSG RAN WG1 Meeting #87 R1-1611548; Title: Discussion on resource selection using partial sensing by pedestrian UEs; Source: Sony; Agenda Item: 6.2.1.2.2; Document for: Discussion; Location and Date: Reno, USA, Nov. 14-18, 2016, consisting of 4-pages.
3GPP TS 36.213 V14.1.0; 3rd Generation Partnership Project; Technical Specification Group Radio Access Network; Evolved Universal Terrestrial Radio Access (E-UTRA); Physical layer procedures (Release 14); Dec. 2016, consisting of 414-pages.
Supplementary European Search Report dated Oct. 30, 2020 for International Application No. 18751817.0, consisting of 9-pages.
Ran WG1 Meeting #86 R1-168217; Title: List of agreements for "Support for V2V services based on LTE sidelink"; Agenda Item: 7.2.2; Source: LG Electronics; Document for: Information; Location and Date: Gothenburg, Sweden, Aug. 22-26, 2016, consisting of 46-pages.
3GPP TSG RAN WG1 Meeting #86 R1-166513; Title: On timing relationship between sensing window, packet arrival, resource reselection trigger, PSCCH and PSSCH transmissions; Agenda Item: 7.2.2.2.2; Source: Intel Corporation; Document for: Discussion and decision; Location and Date: Gothenburg, Sweden, Aug. 22-26, 2016, consisting of 8-pages.
Indian Office Action dated Dec. 23, 2020 for Application No. 201917036678, consisting of 6-pages.
Chinese Office Action and English Summary dated Nov. 25, 2022 for Application No. 201880024188.X, consisting of 11 pages.
3GPP TSG RAN WG1 Meeting #86 R1-166435; Title: Discussion on details of resource reslection and reservation; Source: CATT; Agenda Item: 7.2.2.2.2; Document for: Discussion and Decision; Location and Date: Gothenburg, Sweden, Aug. 22-26, 2016, consisting of 5 pages.
3GPP TSG RAN WG1 Meeting #87 R1-1612233; Title: Discussion on partial sensing of pedestrian UEs; Source: Xinwei; Agenda Item: 6.2.1.2.2; Document for: Discussion; Location and Date: Reno, USA Nov. 14-18, 2016, consisting of 5 pages.

* cited by examiner

RESOURCE SELECTION BASED ON LATENCY REQUIREMENTS

CROSS-REFERENCE TO RELATED APPLICATIONS

This application is a continuation of U.S. National Stage patent application Ser. No. 16/480,751, filed on Jul. 25, 2019, entitled "RESOURCE SELECTION BASED ON LATENCY REQUIREMENTS", which claims priority to International Application Serial No. PCT/SE2018/050129, filed Feb. 13, 2018, entitled "RESOURCE SELECTION BASED ON LATENCY REQUIREMENTS,", which claims priority to U.S. Provisional Application Ser. No. 62/458,323, filed Feb. 13, 2017, the entireties of all of which are incorporated herein by reference.

FIELD

This disclosure relates to wireless communications, and in particular, to resource selection based on latency requirements.

BACKGROUND

During the life cycle of the $3^{rd}$ Generation Partnership Project (3GPP) Release 12 of the long term evolution standard (LTE), the LTE standard has been extended to support device to device (D2D) (specified as "sidelink") features targeting both commercial and public safety applications. Some applications enabled by Rel-12 LTE are device discovery, where devices are able to sense the proximity of another device and associated applications by broadcasting and detecting discovery messages that carry device and application identities. Another application consists of direct communication based on physical channels terminated directly between devices.

One of the potential extensions for the device to device work consists of support of "vehicle" to "x" (V2x) communication, which includes any combination of direct communication between vehicles, pedestrians and infrastructure. V2x communication may take advantage of a network infrastructure, when available, but at least basic V2x connectivity should be possible even in case of lack of network coverage. Providing an LTE-based V2x interface may be economically advantageous because of the LTE economies of scale and it may enable tighter integration between communications with the NW infrastructure (V2I) and vehicle to pedestrian (V2P) and vehicle to vehicle (V2V) communications, as compared to using a dedicated V2x technology.

V2x communications may carry both non-safety and safety information, where each of the applications and services may be associated with specific requirements sets, e.g., in terms of latency, reliability, capacity, etc.

The European Telecommunications Standards Institute (ETSI) has defined two types of messages for road safety: Co-operative Awareness Message (CAM) and Decentralized Environmental Notification Message (DENM).

CAM: The CAM message is intended to enable vehicles, including emergency vehicles, to notify their presence and other relevant parameters in a broadcast fashion. Such messages target other vehicles, pedestrians, and infrastructure, and are handled by their applications. CAM message also serves as active assistance to safety driving for normal traffic. The availability of a CAM message is checked every 100 ms, yielding a maximum detection latency requirement of <=100 ms for most messages. However, the latency requirement for pre-crash sensing warning is 50 ms.

DENM: The DENM message is event-triggered, such as by braking, and the availability of a DENM message is also checked every 100 ms, and the requirement of maximum latency is <=100 ms.

The package size of CAM and DENM message varies from 100+ to 800+ bytes and the typical size is around 300 bytes. The message is supposed to be detected by all vehicles in proximity.

The SAE (Society of the Automotive Engineers) also defined the Basic Safety Message (BSM) for DSRC with various messages sizes defined.

According to the importance and urgency of the messages, the BSMs are further classified into different priorities.

Logical Subframe Indexing

The specification for LTE-V2X defines a logical indexing of the subframes. The purpose of this logical indexing is to exclude the subframes that are not suitable for V2X transmission of data (e.g., because they are used for transmission of synchronization signals, etc.). These subframes are known as reserved subframes. Consequently, two subframes that are consecutive in the logical domain (i.e., with consecutive indices) may not be consecutive in time. The specific logical indexing is configured by the network. Most procedures for LTE-V2X transmission are defined using this logical indexing.

Sensing-Based Resource Allocation with Booking

The specification for LTE-V2X defines two transmission modes: mode 3, in which the network tightly controls the sidelink transmissions by the wireless devices (WDs) (e.g., allocating time-frequency resources, etc.); and mode 4 in which the network does not control the sidelink transmissions by the WDs, or controls them very loosely (e.g., by defining pools of resources but without allocating specific time-frequency resources to the WD).

Transmission mode 4 for LTE-V2X sidelink defines an autonomous resource allocation algorithm based on sensing of ongoing transmissions. The autonomous resource allocation algorithm can be roughly summarized in the following steps.

1) A WD senses the transmission medium during an interval [n-a, n-b], where n is an arbitrary time reference, and a>b≥0 define the duration of the sensing window.
2) Based on the sensing results, the WD predicts the future utilization of the transmission medium at a future time interval [n+T1, n+T2], where T2>T1≥0.
3) The WD selects one or more time-frequency resources in the interval [n+T1, n+T2]. The selection is performed according to an algorithm that is defined in the specification.

The algorithm details for sensing (in Step 1), predicting (in Step 2), and selecting (in Step 3) are defined in the LTE specification (LTE TS 36.213). One aspect is that the selection (Step 3) algorithm introduces some randomness to reduce the probability that WDs with similar sensing and prediction results select the same resources (i.e., leading to a transmission collision). More specifically, larger values for T2 reduce the collision probability.

As a consequence of the algorithm used for autonomous resource allocation, the minimum guaranteed latency for a transmission is limited by the value T2. That is, if a packet arrives at the transmission buffer at time n, the WD can only guarantee that the packet will be transmitted by n+T2 (assuming that the WD performed sensing before the arrival of the packet).

SUMMARY

Some embodiments advantageously provide a method and wireless device for determining a time interval, T2, for selecting a time-frequency resource. According to one aspect, a method includes determining the time interval based on at least one parameter serving as a proxy indicative of a likelihood of collision.

According to this aspect, in some embodiments, at least one of the at least one parameter is a priority level indication, such that a higher priority transmission results in a lower value of T2. In some embodiments, at least one of the at least one parameter is a number of reserved subframes, such that T2 is a fixed value minus the number of reserved subframes. In some embodiments, at least one of the at least one parameter is a number of unavailable subframes, such that $T2=T_{fixed,2}-N_{unavailable}$, where $T_{fixed,2}$ is a fixed value and $N_{unavailable}$ is the number of unavailable subframes in the interval $[n, n+T_{fixed,2}]$. In some embodiments, at least one of the at least one parameter is a packet size, such that the smaller the packet size the lower the value of T2. In some embodiments, at least one of the at least one parameter is a type of transmission, such that T2 is first value for control information and is second, larger value for other types of information. In some embodiments, at least one of the at least one parameter is a transmission format, such that the value of T2 depends on a transmission format modulation and coding scheme, MCS. In some embodiments, at least one of the at least one parameter is a characteristic of a vehicle upon which the WD is one of mounted and incorporated, the characteristic being at least one of position, speed and type of vehicle. In some embodiments, at least one of the at least one parameter is a congestion control indicator, such that when congestion is low, T2 is small, and when suggestion is high, T2 is large. In some embodiments, at least one of the at least one parameter is a budget, such that a transmitter of the WD is enabled to select resources for some packets using a first value of T2 a certain number of times per second, and using a second a second value of T2 to select resources for remaining packets. In some embodiments, T2 depends on which pool of a pool of resources is to be employed during the time interval. In some embodiments, time-frequency resources in the time interval $[n+T1, n+T2]$ are not selected with equal probability. In some embodiments, time-frequency resources in a second time interval $[n+T1, n+T3]$ are selected with lower probability than time-frequency resources in a third time interval $[n+T3+1, n+T2]$.

According to another aspect, a wireless device, WD, configured to determine a time interval, T2, for selecting a time-frequency resource is provided. The WD includes processing circuitry configured to determine the time interval based on at least one parameter serving as a proxy indicative of a likelihood of collision.

According to this aspect, in some embodiments, at least one of the at least one parameter is a priority level indication, such that a higher priority transmission results in a lower value of T2. In some embodiments, at least one of the at least one parameter is a number of reserved subframes, such that T2 is a fixed value minus the number of reserved subframes. In some embodiments, at least one of the at least one parameter is a number of unavailable subframes, such that $T2=T_{fixed,2}-N_{unavailable}$, where $T_{fixed,2}$ is a fixed value and $N_{unavailable}$ is the number of unavailable subframes in the interval $[n, n+T_{fixed,2}]$. In some embodiments, at least one of the at least one parameter is a packet size, such that the smaller the packet size the lower the value of T2. In some embodiments, at least one of the at least one parameter is a type of transmission, such that T2 is a first value for control information and is a second, larger value for other types of information. In some embodiments, at least one of the at least one parameter is a transmission format, such that the value of T2 depends on a transmission format modulation and coding scheme, MCS. In some embodiments, at least one of the at least one parameter is a characteristic of a vehicle upon which the WD is one of mounted and incorporated, the characteristic being at least one of position, speed and type of vehicle. In some embodiments, at least one of the at least one parameter is a congestion control indicator, such that when congestion is low, T2 is small, and when suggestion is high, T2 is large. In some embodiments, at least one of the at least one parameter is a budget, such that a transmitter of the WD is enabled to select resources for some packets using a first value of T2 a certain number of times per second, and using a second a second value of T2 to select resources for remaining packets. In some embodiments, T2 depends on which pool of a pool of resources is to be employed during the time interval. In some embodiments, time-frequency resources in the time interval $[n+T1, n+T2]$ are not selected with equal probability. In some embodiments, time-frequency resources in a second time interval $[n+T1, n+T3]$ are selected with lower probability than time-frequency resources in a third time interval $[n+T3+1, n+T2]$.

According to yet another embodiment, a wireless device, WD, configured to determine a time interval, T2, for selecting a time-frequency resource is provided. The WD includes a time interval determiner module configured to determine the time interval based on at least one parameter serving as a proxy indicative of a likelihood of collision.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
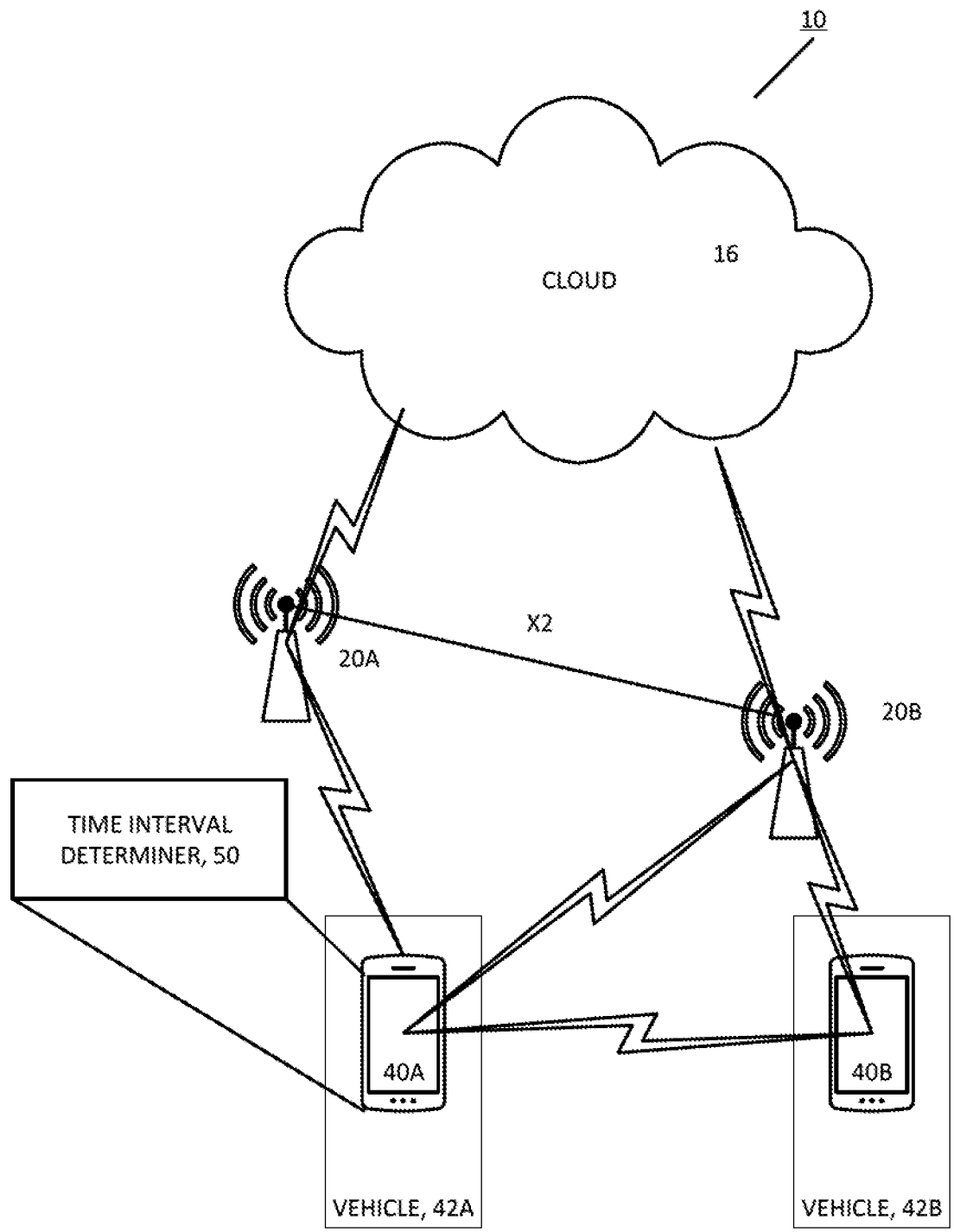
FIG. 1 is a block diagram of a wireless communication network with WDs constructed in accordance with principles set forth herein.

Before describing in detail exemplary embodiments, it is noted that the embodiments reside primarily in combinations of apparatus components and processing steps related to resource selection based on latency requirement. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

The current LTE specification defines a value of T2, cf TS 36.213 Section 14.1.1.6. In some embodiments disclosed herein T2=20 milliseconds. As described above, this constrains the minimum guaranteed transmission latency. To reduce the latency, it is desirable to reduce this value. However, it is not possible to do so without affecting the performance.

In addition, the current specification can only guarantee the latency requirement in terms of logical subframes. To translate the transmission latency capability to actual time (instead of logical subframes), it is necessary to provision for the maximum number of reserved subframes.

Embodiments allow for reduced transmission latency while ensuring that the system performance is not significantly degraded. Embodiments ensure that the transmission latency expressed in actual time is met, regardless of the number of reserved subframes in the system configuration.

Embodiments are discussed introduced in the context of LTE-V2X transmission mode 4 although the general principle may be applied in other transmission modes as well as other radio access technologies.

FIG. 1 is a block diagram of a wireless communication network 10 with WDs constructed in accordance with principles set forth herein. The wireless communication network has a cloud 16 which may include the Internet and/or the Public Switched Telephone Network (PSTN). The wireless communication network also includes base stations 20A and 20B, referred to collectively herein as base stations 20. The base stations 20 may be in communication with one or more WDs, such as WDs 40A and 40B, referred to collectively herein as WDs 40. One or more of the WDs 40 may be mounted on, or incorporated as part of, a vehicle, 42A, 42B, referred to collectively herein as vehicles 42. Note that actual wireless communications 10 may include many more than two base stations 20 and many more than two WDs 40. Also, although WDs 40 are shown as being related to vehicles 42, the disclosure is not limited to such. WDs 40 can be incorporated as part of any V2x communication, e.g., V2P, etc. Vehicles 42 are used only for the sake of expediency to explanation.

A wireless device 40, such as WD 40A, may include a time interval determiner that determines the time interval, T2, based on a least one parameter serving as a proxy indicative of a likelihood of collision. These parameters may include one or more of a priority level indicator, a number of reserved subframes, a packet size, a type of transmission, a transmission format, a vehicle characteristic, a congestion control indicator, and a budget, as explained below.

The term base station, e.g., a Radio Base Station (RBS), sometimes may be referred to herein as, e.g., evolved NodeB "eNB", "eNodeB", "NodeB", "B node", "gNode B", "gNB", or BTS (Base Transceiver Station), depending on the technology and terminology used. The base stations may be of different classes such as, e.g., macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations 20 communicate over the air interface operating on radio frequencies with the wireless devices 40 within range of the base stations 20. In the context of this disclosure, downlink (DL) refers to the transmission path from the base station 20 to the wireless device 40. Uplink (UL) refers to the transmission path in the opposite direction, i.e., from the wireless device 40 to the base station 20.

Although embodiments are described with reference to base stations 20, it is understood that embodiments can be implemented in or across any suitable network node, of which base stations 20 are a type. Further, although reference is made to LTE, embodiments are not limited to LTE but may be implemented in a variety of other radio access technologies (RATs), such as fifth generation (5G) and new radio (NR) technologies.

The 3GPP has issued agreements concerning NR terminology in the period between the earliest priority date and the filing date of the present disclosure. NR terminology and LTE terminology coincide to a considerable extent; for instance, a resource element (RE) remains 1 subcarrier×1 OFDM symbol. Yet some terms known in LTE have been given a new meaning in NR. This disclosure, including the claims, applies prefixes "LTE" and "NR" when indefiniteness could otherwise arise A non-prefixed term in this disclosure is to be understood in the LTE sense unless otherwise stated. However, any term designating an object or operation known from LTE is expected to be reinterpreted functionally in view of NR specifications. Examples: An LTE radio frame may be functionally equivalent to an NR frame, considering that both have a duration of 10 ms. An LTE eNB may be functionally equivalent to an NR gNB, since their functionalities as downlink transmitter are at least partially overlapping. The least schedulable resource unit in LTE may be reinterpreted as the least schedulable resource unit in NR. The shortest data set for which LTE acknowledgement feedback is possible may be reinterpreted as the shortest data set for which NR acknowledgement feedback is possible.

Therefore, even though some embodiments of this disclosure have been described using LTE-originated terminology, they remain fully applicable to NR technology.

The term wireless device can be a user equipment (UE) and may refer to any type of wireless device 40 communicating with a base station 20 and/or with another wireless device 40 in a cellular or mobile communication system. Examples of a wireless device 40 are target device, device to device (D2D) wireless device, machine type wireless device or wireless device capable of machine to machine (M2M) communication, PDA, iPAD, Tablet, mobile terminals, smart phone, laptop embedded equipped (LEE), laptop mounted equipment (LME), USB dongles, etc.

Embodiments include choosing the value of T2 as a function of at least one parameter serving as a proxy indicative of a likelihood of collision. The parameter may include any of the following:

A priority level indication (e.g., a proximity services per packet priority (PPPP) value or a quality of service (QoS)-related parameter). This allows, for example, for high-priority transmissions using small values for T2, ensuring low latency, while having the rest of the transmissions use larger values for T2, minimizing system performance degradation.

A number of reserved subframes. T2 may be chosen as a fixed value $T_{fixed}$ minus the number of reserved subframes in the interval $[n, n+T_{fixed}]$. That is, $T2 = T_{fixed} - N_{reserved}$ where is a fixed $T_{fixed}$ value and $N_{reserved}$ is the number of reserved subframes in the interval $[n, n+T_{fixed}]$. This ensures that the latency requirement is met in terms of actual time and not only logical indexing. As used herein, "n" refers to the time a packet arrives at the transmission buffer. In other words, "n" is a time at which lower communication layers begin to formulate a scheduling decision."

- A number of unavailable/available subframes (e.g., for V2X transmission by a certain WD). T2 may be chosen as a fixed value, $T_{fixed,2}$, minus the number of unavailable subframes in the interval [n, n+$T_{fixed,2}$]. That is, T2=$T_{fixed,2}$−$N_{unavailable}$ where $T_{fixed,2}$ is a fixed value and $N_{unavailable}$ is the number of unavailable subframes in the interval [n, n+$T_{fixed,2}$]. Examples of unavailable subframes are: reserved subframes, subframes not available due to TDD (Time Division Duplex) configuration (e.g., only uplink subframes are used in V2X), subframes not available for a specific geographical zone (e.g., in the case of zoning), subframes used for other services than V2X, etc. This ensures that the latency requirement is met in terms of actual time and not only logical indexing. Alternatively, this embodiment may be expressed in an equivalent manner in terms of available subframes, i.e., T2 chosen to include only the available subframes in [n, n+$T_{fixed,2}$].
- A packet size. This allows, for example, for transmitting small packets with high priority whereas large packets are transmitted with normal latency, minimizing system performance degradation.
- A type of transmission. For example, packets containing control information (e.g., ACK/NACK feedback packets) may use small values for T2, while the rest of the packets use larger values of T2. The discrimination between types of transmission may be based on properties at any protocol layer (e.g., packets from different applications or services, etc.).
- A transmission format. For example, the value of T2 may depend on a modulation and coding scheme.
- A characteristic of the vehicle mounting the WD 40 or a parameter associated with the vehicle. For example, position, speed, type of vehicle, vehicle in service indicator (e.g., ambulance on a mission, truck in a platoon), etc.
- Congestion control indicator (e.g., congestion busy ratio (CBR), channel ratio (CR), etc.). For example, small values of T2 may be allowed when the congestion level is low whereas large values of T2 may be required for higher levels of congestion.
- A budget of low latency transmissions. For example, a transmitter may be allowed to select resources using a first value for T2 a certain number of times per second. The rest of the packets are transmitted using a second value for T2.

Note that selection of T2 may depend on a combination of parameters.

OTHER EMBODIMENTS

In some embodiments, the implementation may depend on a configuration of a pool of resources. For example,
  The allowed values for T2 may be pool specific;
  The admissible parameter(s) and/or their range(s) of values for selecting T2 are pool specific.
In some embodiments, the value of T2 is only a bound value (e.g., minimum, maximum). The WD 40 has freedom in choosing the actual value as long as the bound is respected.

In some embodiments, one of the values a and b defining the sensing window [n-a, n-b] is chosen as described herein.

In yet a further embodiment, resources at subframes [n+T1, n+T2] may not be selected with equal probability and resources at subframes [n+T1, n+T3] may be selected with a lower probability than resources at subframes [n+T3+1, n+T2]. This may ensure that WDs 40 that need to perform an urgent transmission have high probability of finding a free resource in the interval [n+T1, n+T3].

In some embodiments set forth herein the WD determining a time T2 for selecting a time-frequency resource, where the time-frequency resource is defined as time-frequency resource for transmitting and/or receiving data in a wireless communication network. Exemplary time-frequency resources may be defined by resource elements (RE), symbols, subframes, slots, mini-slots, or radio-frames.

In some embodiment the WD choosing the T2 includes the WD selecting T2 from a set of values. One of the values may in some embodiments be 20 ms and at least one value lower than 20 ms. The selection of the value of T2 may be a function of at least one parameter serving as a proxy indicative of a likelihood of collision. The at least one parameter may include at least one of the parameter disclosed above. In a preferred embodiment the at least one parameter includes a priority level indication (e.g., a proximity services per packet priority (PPPP) value or a quality of service (QoS)-related parameter), as described above.

In some embodiments the minimum value of T2 can be reduced to support layer 1 latency reduction. Pre-configuration and configuration based selection of minimum value of T2 is supported. The minimum value of T2 is selected from a set of values. The set of values includes at least 20 ms, and a value lower than 20 ms. In further related embodiments the pre-configuration or configuration is per PPPP, CBR range or per carrier.

Figure 2:
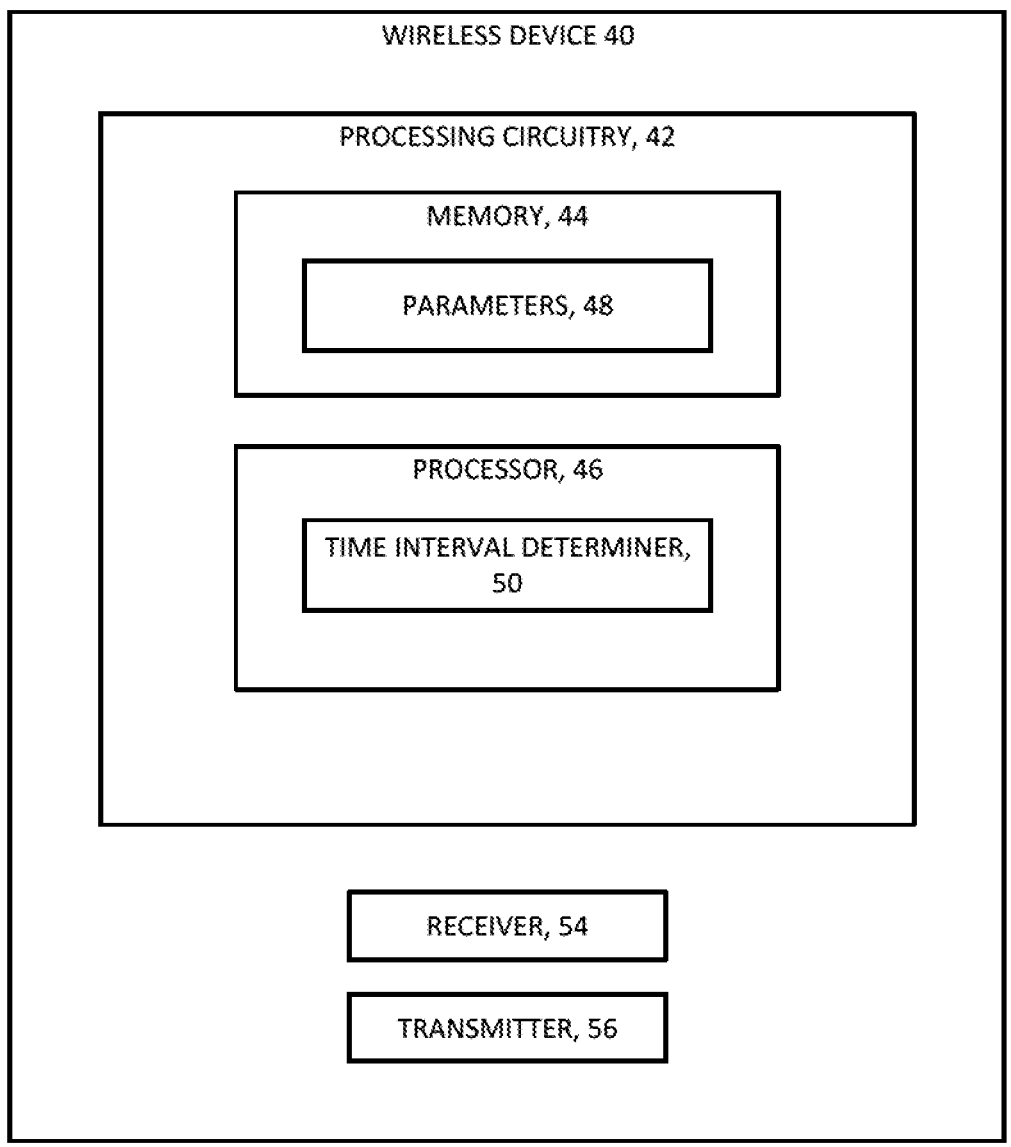
FIG. 2 is a block diagram of a wireless device (WD) 40 configured according to principles set forth herein.

FIG. 2 is a block diagram of a wireless device (WD) 40 configured according to principles set forth herein. The WD 40 has processing circuitry 42. In some embodiments, the processing circuitry may include a memory 44 and processor 46, the memory 44 containing instructions which, when executed by the processor 46, configure processor 46 to perform the one or more functions described herein. In addition to a traditional processor and memory, processing circuitry 42 may comprise integrated circuitry for processing and/or control, e.g., one or more processors and/or processor cores and/or FPGAs (Field Programmable Gate Array) and/or ASICs (Application Specific Integrated Circuitry).

Processing circuitry 42 may include and/or be connected to and/or be configured for accessing (e.g., writing to and/or reading from) memory 44, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by control circuitry and/or other data, e.g., data pertaining to communication, e.g., configuration and/or address data of nodes, etc. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 42 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The memory 44 stores parameters 48 that serve as a proxy indicative of a likelihood of collision, as explained above. The processor 46 is programmable to perform the functions of a time interval determiner 50 that determines the time interval T2 based on at least one of the parameters 48. The WD 40 may also include a receiver 54 and a transmitter 56.

Figure 3:
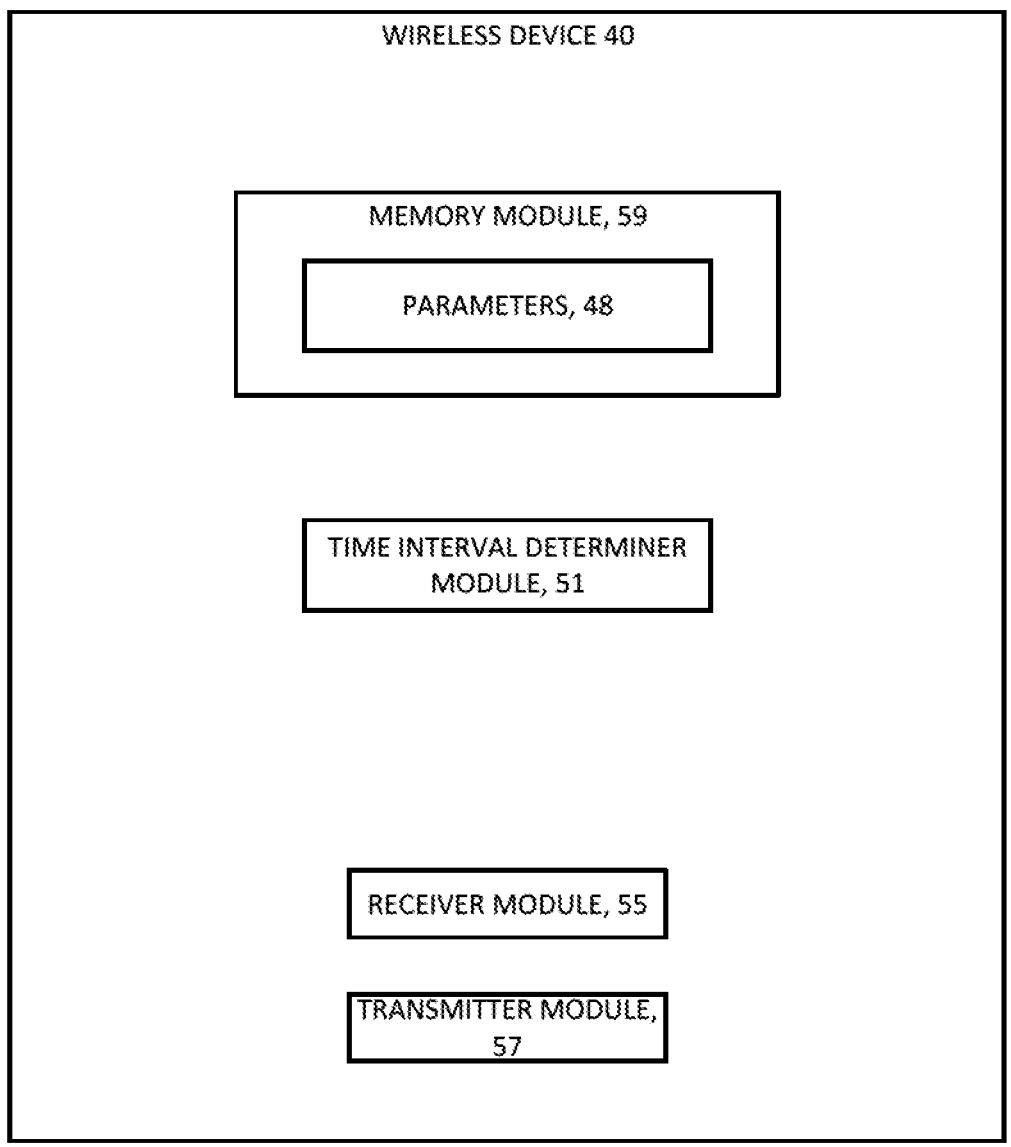
FIG. 3 is a block diagram of an alternative embodiment of a WD configured according to principles set forth herein.

FIG. 3 is a block diagram of an alternative embodiment of a WD 40 having a memory module 59 and a software module, time interval determiner module 51, configured to determine the time interval, T2, based on at the least one parameter 48. The WD 40 also has a receiver module 55 and a transmitter module 57, each of which may be implemented partially in software.

Figure 4:
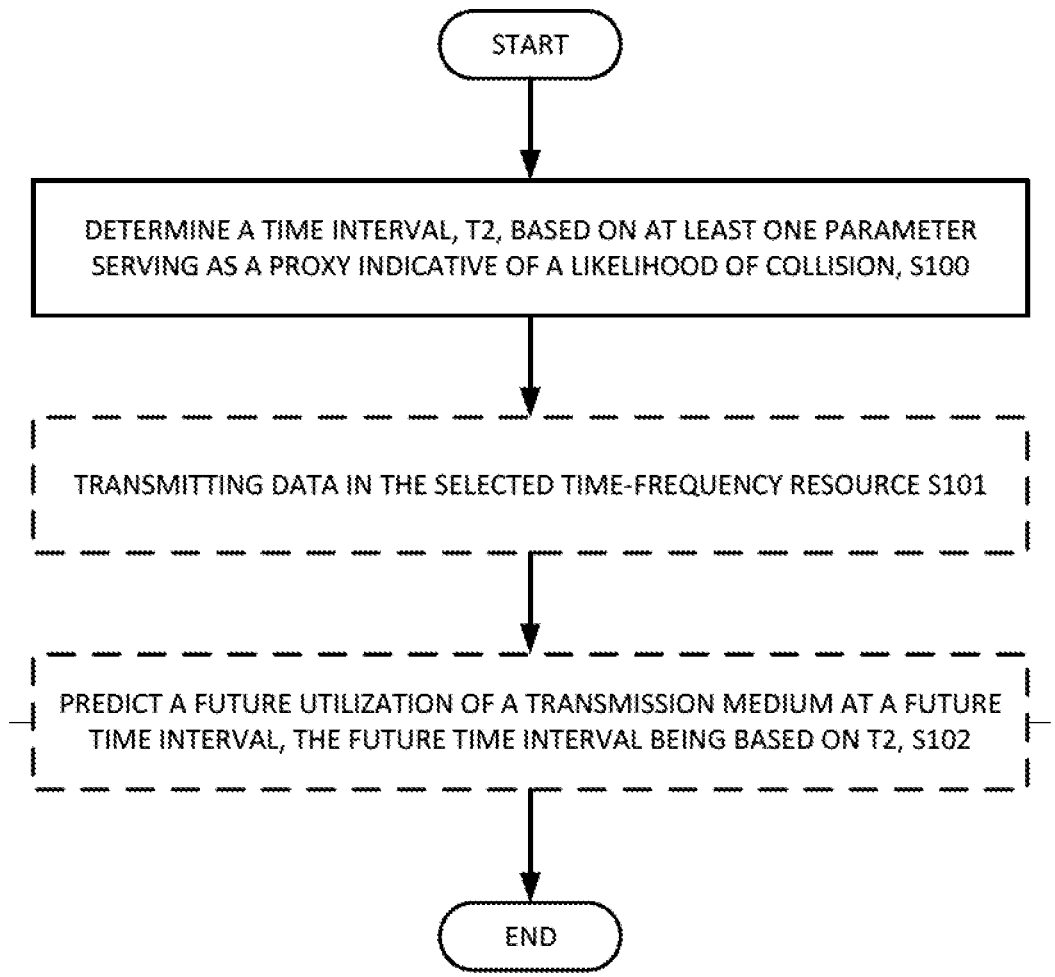
FIG. 4 is a flowchart of an exemplary process in a WD for determining the time interval, T2, for selecting time frequency resources.

FIG. 4 is a flowchart of an exemplary process in WD 40 for determining the time interval, T2, for selecting time frequency resources. The process includes determining the time interval based on at least one parameter serving as a proxy indicative of a likelihood of collision via the time interval determiner 50 (block S100). This reduces the probability that WDs with similar sensing and prediction results select the same resources (i.e., leading to a transmission collision). The WD may then transmit data in the selected time frequency resource (S101). The transmission may include V2X data to another WD. Optionally, the WD 40 predicts a future utilization of a transmission medium at a future time interval, the future time interval being based on T2 (block S102).

Thus, some embodiments include a method to select resources that reduce latency while controlling the probability of packet collision. Different WDs 40 may select resources based on different values of a parameter that serves as a proxy indicative of a likelihood of confusion. Also, although the embodiments are described herein with reference to the WD 40 the time T2, it is contemplated that other elements within the system 10 could determine T2 and pass that value to WD 40. In other words, it is contemplated that the functionality described herein could be distributed to other network elements.

| Abbreviation | Explanation |
|---|---|
| 3G | Third Generation of Mobile Telecommunications Technology |
| 3GPP | Third Generation Partnership Project |
| ACK | Acknowledgement |
| BSM | Basic Safety Message |
| BW | Bandwidth |
| CAM | Cooperative Awareness Message |
| CBR | Congestion Busy Ratio |
| CR | Channel (occupancy) Ratio |
| CDMA | Code-Division Multiple Access |
| D2D | Device-to-Device Communication |
| DENM | Decentralized Environmental Notification Message |
| DSRC | Dedicated Short-Range Communications |
| eNB | eNodeB |
| ETSI | European Telecommunications Standards Institute |
| FDMA | Frequency-Division Multiple Access |
| GLONASS | Global Navigation Satellite System |
| GSM | Global System for Mobile Communications |
| GPS | Global Positioning System |
| LTE | Long-Term Evolution |
| NACK | Negative Acknowledgement |
| NW | Network |
| OFDM | Orthogonal-Frequency-Division Multiplexing |
| PPP | Per Packet Priority |
| PPPP | ProSe Per Packet Priority |
| ProSe | Proximity Services |
| PSBCH | Physical Sidelink Broadcast Channel |
| TA | Timing Advance |
| TDMA | Time-Division Multiple Access |
| TF | Transport Format |

-continued

| Abbreviation | Explanation |
|---|---|
| UTC | Coordinated Universal Time |
| SAE | Society of the Automotive Engineers |
| UE | User Equipment |
| V2I | Vehicle-to-Infrastructure |
| V2P | Vehicle-to-Pedestrian |
| V2V | Vehicle-to-vehicle communication |
| V2x | Vehicle-to-anything-you-can-imagine |
| wrt | with respect to |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (thereby creating a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

EMBODIMENTS

Embodiment 1. A method for use in a wireless device, WD, for determining a time, T2, for selecting a time-frequency resource in a time interval [n+T1, n+T2], the method comprising:
determining the time T2 based on at least one parameter serving as a proxy indicative of a likelihood of collision.

Embodiment 2. The method of Embodiment 1, wherein at least one of the at least one parameter is a priority level indication, such that a higher priority transmission results in a lower value of T2.

Embodiment 3. The method of any of Embodiments 1 and 2, wherein at least one of the at least one parameter is a number of reserved subframes, such that T2 is a fixed value minus the number of reserved subframes.

Embodiment 4. The method of any of Embodiments 1-3, wherein at least one of the at least one parameter is a number of unavailable subframes, such that $T2=T_{fixed,2}-N_{unavailable}$, where $T_{fixed,2}$ is a fixed value and $N_{unavailable}$ is the number of unavailable subframes in the interval [n, $n+T_{fixed,2}$].

Embodiment 5. The method of any of Embodiments 1-4, wherein at least one of the at least one parameter is a packet size, such that the smaller the packet size the lower the value of T2.

Embodiment 6. The method of any of Embodiments 1-5, wherein at least one of the at least one parameter is a type of transmission, such that T2 is a first value for control information and is a second, larger value for other types of information.

Embodiment 7. The method of any of Embodiments 1-6, wherein at least one of the at least one parameter is a transmission format, such that the value of T2 depends on a transmission format modulation and coding scheme, MCS.

Embodiment 8. The method of any of Embodiments 1-7, wherein at least one of the at least one parameter is a characteristic of a vehicle upon which the WD is one of mounted and incorporated, the characteristic being at least one of position, speed and type of vehicle.

Embodiment 9. The method of any of Embodiments 1-8, wherein at least one of the at least one parameter is a congestion control indicator, such that when congestion is low, T2 is small, and when suggestion is high, T2 is large.

Embodiment 10. The method of any of Embodiments 1-9, wherein at least one of the at least one parameter is a budget, such that a transmitter of the WD is enabled to select resources for some packets using a first value of T2 a certain number of times per second, and using a second a second value of T2 to select resources for remaining packets.

Embodiment 11. The method of any of Embodiments 1-10, wherein T2 depends on which pool of a pool of resources is to be employed during the time interval.

Embodiment 12. The method of any of Embodiments 1-11, wherein time-frequency resources in the time interval [n+T1, n+T2] are not selected with equal probability.

Embodiment 13. The method of any of Embodiments 1-12, wherein time-frequency resources in a second time interval [n+T1, n+T3] are selected with lower probability than time-frequency resources in a third time interval [n+T3+1, n+T2].

Embodiment 14. A wireless device, WD, configured to determine a time, T2, for selecting a time-frequency resource in a time interval [n+T1, n+T2], the WD comprising:
processing circuitry configured to:
determine the time T2 based on at least one parameter serving as a proxy indicative of a likelihood of collision.

Embodiment 15. The wireless device of Embodiment 14, wherein at least one of the at least one parameter is a priority level indication, such that a higher priority transmission results in a lower value of T2.

Embodiment 16. The wireless device of any of Embodiments 14 and 15, wherein at least one of the at least one parameter is a number of reserved subframes, such that T2 is a fixed value minus the number of reserved subframes.

Embodiment 17. The method of any of Embodiments 14-16, wherein at least one of the at least one parameter is a number of unavailable subframes, such that $T2=T_{fixed,2}-N_{unavailable}$, where $T_{fixed,2}$ is a fixed value and $N_{unavailable}$ is the number of unavailable subframes in the interval [n, $n+T_{fixed,2}$].

Embodiment 18. The wireless device of any of Embodiments 14-17, wherein at least one of the at least one parameter is a packet size, such that the smaller the packet size the lower the value of T2.

Embodiment 19. The wireless device of any of Embodiments 14-18, wherein at least one of the at least one parameter is a type of transmission, such that T2 is a first value for control information and is second, larger value for other types of information.

Embodiment 20. The wireless device of any of Embodiments 14-19, wherein at least one of the at least one parameter is a transmission format, such that the value of T2 depends on a transmission format modulation and coding scheme, MCS.

Embodiment 21. The wireless device of any of Embodiments 14-20, wherein at least one of the at least one parameter is a characteristic of a vehicle upon which the WD is one of mounted and incorporated, the characteristic being at least one of position, speed and type of vehicle.

Embodiment 22. The wireless device of any of Embodiments 14-21, wherein at least one of the at least one parameter is a congestion control indicator, such that when congestion is low, T2 is small, and when suggestion is high, T2 is large.

Embodiment 23. The wireless device of any of Embodiments 14-22, wherein at least one of the at least one parameter is a budget, such that a transmitter of the WD is enabled to select resources for some packets using a first value of T2 a certain number of times per second, and using a second a second value of T2 to select resources for remaining packets.

Embodiment 24. The wireless device of any of Embodiments 14-23, wherein T2 depends on which pool of a pool of resources is to be employed during the time interval.

Embodiment 25. The wireless device of any of Embodiments 13-24, wherein time-frequency resources in the time interval [n+T1, n+T2] are not selected with equal probability.

Embodiment 26. The wireless device of any of Embodiments 14-25, wherein time-frequency resources in a second time interval [n+T1, n+T3] are selected with lower probability than time-frequency resources in a third time interval [n+T3+1, n+T2].

Embodiment 27. A wireless device, WD, configured to determine a time, T2, for selecting a time-frequency resource in a time interval [n+T1, n+T2], the WD comprising:
a time interval determiner module configured to determine the time T2, based on at least one parameter serving as a proxy indicative of a likelihood of collision.

The invention claimed is:
1. A method for use in a wireless device, WD, for determining a second time, T2, for selecting a resource in a time interval [n+T1, n+T2], where T2>T1≥0, T1 is a first time, and n is a time reference, the method comprising:
determining a minimum value of T2 based on a priority level indication;
determining T2 respecting a bound of the minimum value of T2;
selecting the resource in the time interval [n+T1, n+T2]; and
transmitting data in the selected resource.
2. The method of claim 1, wherein the resource is a time-frequency resource.
3. The method of claim 2, wherein time-frequency resources in the time interval [n+T1, n+T2] are not selected with equal probability.
4. The method of claim 1, wherein the priority level indication is a proximity services per packet priority (PPPP) value.
5. The method of claim 1, wherein the priority level indication causes a higher priority transmission to result in a lower value of the minimum value of T2.
6. The method of claim 1, wherein the minimum value of T2 depends on which one pool of a plurality of pool of resources is to be employed, the selected resource being part of the one pool.
7. The method of claim 1, wherein determining the minimum value of T2 is based on at least one parameter serving as a proxy indicative of a likelihood of collision and comprises selecting the minimum value of T2 from a set of predetermined minimum T2 values.
8. The method of claim 7, wherein the at least one parameter is at least one taken from a group consisting of:
a number of reserved subframes that causes T2 to be a fixed value minus the number of reserved subframes; and
a number of unavailable subframes that causes T2=Tfixed,2-Nunavailable, where Tfixed,2 is a fixed value associated at least with the unavailable subframes and Nunavailable is the number of unavailable subframes in the time interval [n, n+Tfixed,2].
9. The method of claim 7, wherein at least one of the at least one parameter is a packet size, such that the smaller the packet size the lower the minimum value of T2.
10. The method of claim 7, wherein the at least one parameter is at least one taken from a group consisting of:
a type of transmission that causes the minimum value of T2 to be a first value for control information and to be a second, larger value for other types of information;
a characteristic of a vehicle upon which the WD is one of mounted and incorporated, the characteristic being at least one of position, speed and type of vehicle; and
a budget that causes a transmitter of the WD to be enabled to select resources for a plurality packets using a first value of the minimum value of T2 a certain number of times per second and using a second value of the minimum value of T2 to select resources for remaining packets.
11. The method of claim 7, wherein at least one of the at least one parameter is a congestion control indicator that, when congestion is low, causes the minimum value of T2 to be small, and, when suggestion is high, causes the minimum value of T2 to be large.
12. A wireless device, WD, configured to determine a second time, T2, for selecting a resource in a time interval [n+T1, n+T2], where T2>T1≥0, T1 is a first time, and n is a time reference, the WD comprising processing circuitry configured to:
determine a minimum value of T2 based on a priority level indication;
determine T2 respecting a bound of the minimum value of T2;
select the resource in the time interval [n+T1, n+T2]; and
transmit data in the selected resource.
13. The WD of claim 12, wherein the resource is a time-frequency resource.
14. The WD of claim 13, wherein time-frequency resources in the time interval [n+T1, n+T2] are not selected with equal probability.
15. The WD of claim 12, wherein the priority level indication is a proximity services per packet priority (PPPP) value.
16. The WD of claim 12, wherein the priority level indication causes a higher priority transmission to result in a lower value of the minimum value of T2.
17. The WD of claim 12, wherein the minimum value of T2 depends on which one pool of a plurality of pool of resources is to be employed, the selected resource being part of the one pool.
18. The WD of claim 12, wherein determining the minimum value of T2 is based on at least one parameter serving as a proxy indicative of a likelihood of collision and com- prises selecting the minimum value of T2 from a set of predetermined minimum T2 values.

19. The WD of claim 18, wherein the at least one parameter is at least one taken from a group consisting of:
a number of reserved subframes that causes T2 to be a fixed value minus the number of reserved subframes; and
a number of unavailable subframes that causes T2=Tfixed,2-Nunavailable, where Tfixed,2 is a fixed value associated at least with the unavailable subframes and Nunavailable is the number of unavailable subframes in the time interval [n, n+Tfixed,2].

20. The WD of claim 18, wherein at least one of the at least one parameter is a packet size, such that the smaller the packet size the lower the minimum value of T2.

21. The WD of claim 18, wherein the at least one parameter is at least one taken from a group consisting of:
a type of transmission that causes the minimum value of T2 to be a first value for control information and to be a second, larger value for other types of information;
a characteristic of a vehicle upon which the WD is one of mounted and incorporated, the characteristic being at least one of position, speed and type of vehicle; and
a budget that causes a transmitter of the WD to be enabled to select resources for a plurality packets using a first value of the minimum value of T2 a certain number of times per second and using a second a second value of the minimum value of T2 to select resources for remaining packets.

22. The WD of claim 18, wherein at least one of the at least one parameter is a congestion control indicator that, when congestion is low, causes the minimum value of T2 to be small, and, when suggestion is high, causes the minimum value of T2 to be large.

23. A non-transitory computer storage medium storing an executable computer program that, when executed by a wireless device, performs a method for determining a second time, T2, for selecting a time-frequency resource in a time interval [n+T1, n+T2], where $T2 > T1 \geq 0$, T1 is a first time, and n is a time reference, the method comprising:
determining a minimum value of T2 based on a priority level indication;
determining T2 respecting a bound of the minimum value of T2;
selecting the resource in the time interval [n+T1, n+T2]; and
transmitting data in the selected resource.

* * * * *

UNITED STATES PATENT AND TRADEMARK OFFICE
CERTIFICATE OF CORRECTION

PATENT NO. : 11,564,256 B2
APPLICATION NO. : 17/337877
DATED : January 24, 2023
INVENTOR(S) : Blasco Serrano et al.

It is certified that error appears in the above-identified patent and that said Letters Patent is hereby corrected as shown below:

On the Title Page

On Page 2, item (56), under "OTHER PUBLICATIONS", in Column 2, Line 15, delete "Ran" and insert -- RAN --, therefor.

On Page 2, item (56), under "OTHER PUBLICATIONS", in Column 2, Line 31, delete "reslection" and insert -- reselection --, therefor.

In the Specification

In Column 1, Line 9, delete "2019," and insert -- 2019, now U.S. Pat. No. 11,051,336 --, therefor.

In Column 1, Line 28, delete "standard (LTE)," and insert -- (LTE) standard, --, therefor.

In Column 1, Line 48, delete "infrastructure (V2I)" and insert -- vehicle to infrastructure (V2I) --, therefor.

In Column 3, Line 39, delete "a second a second" and insert -- a second --, therefor.

In Column 4, Line 18, delete "a second a second" and insert -- a second --, therefor.

In Column 5, Line 22, delete "introduced" and insert -- and introduced --, therefor.

In Column 5, Line 37, delete "vehicles 42." and insert -- vehicles 42x. --, therefor.

In Column 5, Line 41, delete "vehicles 42," and insert -- vehicles 42x, --, therefor.

In Column 5, Line 43, delete "Vehicles 42" and insert -- Vehicles 42x --, therefor.

In Column 5, Line 47, delete "a least" and insert -- at least --, therefor.

Signed and Sealed this
Third Day of October, 2023

Katherine Kelly Vidal
*Director of the United States Patent and Trademark Office*

CERTIFICATE OF CORRECTION (continued)
U.S. Pat. No. 11,564,256 B2

In Column 6, Line 21, delete "arise" and insert -- arise. --, therefor.

In Column 6, Line 47, delete "equipped" and insert -- equipment --, therefor.

In Column 7, Line 19, delete "T2 chosen" and insert -- T2 is chosen --, therefor.

In Column 7, Line 55, delete "example," and insert -- example: --, therefor.

In Column 8, Line 10, delete "(RE)" and insert -- (REs) --, therefor.

In Column 8, Line 12, delete "embodiment" and insert -- embodiments --, therefor.

In Column 8, Line 42, delete "Array)" and insert -- Arrays) --, therefor.

In Column 8, Line 43, delete "Circuitry)." and insert -- Circuitries). --, therefor.

In Column 9, Line 51, delete "Device-to-Device Communication" and insert -- Device-to-Device --, therefor.

In Column 9, Line 53, delete "Communications" and insert -- Communication --, therefor.

In Column 9, Line 63, delete "Services" and insert -- Service --, therefor.

In Column 12, Line 22, delete "a second a second" and insert -- a second --, therefor.

In Column 13, Line 19, delete "a second a second" and insert -- a second --, therefor.

In the Claims

In Column 14, Line 12, in Claim 8, delete "T2=Tfixed, 2-Nunavailable," and insert -- $T2=T_{fixed,2}-N_{unavailable}$, --, therefor.

In Column 14, Line 12, in Claim 8, delete "Tfixed,2" and insert -- $T_{fixed,2}$ --, therefor.

In Column 14, Line 14, in Claim 8, delete "Nunavailable" and insert -- $N_{unavailable}$ --, therefor.

In Column 14, Line 15, in Claim 8, delete "Tfixed,2]." and insert -- $T_{fixed,2}$]. --, therefor.

In Column 15, Line 9, in Claim 19, delete "T2=Tfixed,2-Nunavailable," and insert -- $T2=T_{fixed,2}-N_{unavailable}$, --, therefor.

In Column 15, Line 9, in Claim 19, delete "Tfixed,2" and insert -- $T_{fixed,2}$ --, therefor.

In Column 15, Line 11, in Claim 19, delete "Nunavailable" and insert -- $N_{unavailable}$ --, therefor.

CERTIFICATE OF CORRECTION (continued)
U.S. Pat. No. 11,564,256 B2

In Column 15, Line 12, in Claim 19, delete "Tfixed,2]." and insert -- $T_{fixed,2}$]. --, therefor.

In Column 16, Line 2, in Claim 21, delete "a second a second" and insert -- a second --, therefor.